United States Patent
Sabin et al.

(10) Patent No.: US 7,734,962 B2
(45) Date of Patent: Jun. 8, 2010

(54) SECURE PROBLEM RESOLUTION TECHNIQUES FOR COMPLEX DATA RESPONSE NETWORKS

(75) Inventors: Jason Allen Sabin, Pleasant Grove, UT (US); Vernon Roger Holm, Sandy, UT (US); Carolyn B. McClain, Springville, UT (US)

(73) Assignee: Novell, Inc., Provo, UT (US)

( * ) Notice: Subject to any disclaimer, the term of this patent is extended or adjusted under 35 U.S.C. 154(b) by 485 days.

(21) Appl. No.: 11/743,368

(22) Filed: May 2, 2007

(65) Prior Publication Data

US 2008/0276134 A1 Nov. 6, 2008

(51) Int. Cl.
*G06F 11/00* (2006.01)
(52) U.S. Cl. .............................. 714/48; 714/57; 726/5
(58) Field of Classification Search .................. 714/48, 714/57, 27; 713/168; 726/5
See application file for complete search history.

(56) References Cited

U.S. PATENT DOCUMENTS

| | | | |
|---|---|---|---|
| 5,602,921 A * | 2/1997 | Ramadei | 380/51 |
| 6,735,721 B1 * | 5/2004 | Morrow et al. | 714/57 |
| 6,973,671 B1 | 12/2005 | Hsing et al. | |
| 7,577,886 B2 * | 8/2009 | Bancel et al. | 714/724 |
| 2001/0037453 A1 | 11/2001 | Mitty et al. | |
| 2003/0236992 A1 * | 12/2003 | Yami | 713/200 |
| 2004/0139346 A1 | 7/2004 | Watt et al. | |
| 2005/0054334 A1 | 3/2005 | Brown et al. | |
| 2005/0149750 A1 * | 7/2005 | Lisanke et al. | 713/200 |
| 2005/0204249 A1 * | 9/2005 | Haug et al. | 714/746 |
| 2005/0232421 A1 | 10/2005 | Simons et al. | |
| 2006/0293035 A1 | 12/2006 | Brown et al. | |
| 2008/0229160 A1 * | 9/2008 | Prescott et al. | 714/57 |

* cited by examiner

*Primary Examiner*—Marc Duncan
(74) *Attorney, Agent, or Firm*—Schwegman, Lundberg & Woessner, P.A.

(57) ABSTRACT

In various embodiments, techniques for secure problem resolution associated with complex data response networks are provided. Error messages associated with an executing problem service are trapped and hidden from a principal. The error messages are associated with a randomly generated incident identifier. The incident identifier is supplied to the principal. The principal gains access to the error messages when the principal successfully authenticates for access and supplies the incident identifier.

21 Claims, 3 Drawing Sheets

SECURE PROBLEM RESOLUTION TECHNIQUES FOR COMPLEX DATA RESPONSE NETWORKS

FIELD

The invention relates generally to security and more particularly to secure problem resolution techniques for complex data response networks.

BACKGROUND

It is common practice in today's highly networked environment for remote software systems or services to be made available to end users over the Internet from geographically disperse locations, which can originate from potentially all over the entire globe. Sometimes these systems fail or encounter errors of some kind. Typically, this results in error codes and messages being sent to the end users over the Internet. In many cases, these error codes contain valuable information about the remote service and/or its configuration. Moreover, the mere presence of this information can create unsuspecting security vulnerabilities for the remote software systems.

In fact, it is common practice to embed system information into display screens presented to end users (e.g., login screens, error screens, etc.) that can aid system administrators or help desks in identifying software elements, system devices, and the like involved in processing events leading up to the screen presentation of error information. The information when relayed from an end user to help desk personnel or when obtained by a system administrator can prove to be invaluable when trying to resolve problems occurring within complex and often geographically dispersed processing environments in which multiple devices and/or services participate in the delivery of content to end users.

However, the mere presence of such informative error messages may also pose a substantial security risk if these messages convey information that can be used in a malicious or nefarious manner by intruders to compromise the back-end system or service being remotely supplied to an end user.

For example, some Hypertext Transfer Protocol (HTTP) messages include a common port identification for which a communication error occurred. Although this may seem on the surface to be fairly innocuous, it actually can provide specific port identification to an intruder. Thus, the intruder can identify the port over which Internet communications are occurring for a specific environment. This is but one example where seemingly innocent error messages, which have been standardized to some degree across platforms and environments, can supply useful configuration information about a backend system to intruders.

Accordingly, what is needed are more secure problem resolution techniques for complex data response networks.

SUMMARY

In various embodiments, techniques for secure problem resolution in complex data networks are provided. More specifically, and in an embodiment, a method is provided for securely providing error data associated with a processing service. A raised exception is detected within a processing service. The raised exception is associated with an error or warning occurring within the service. Next, a random incident identifier is generated for the raised exception and the incident identifier is associated with the raised exception. Finally, the incident identifier is provided to a principal that is using the service for subsequent use in acquiring the error or warning once the principal properly authenticates for access.

DETAILED DESCRIPTION

Figure 1:
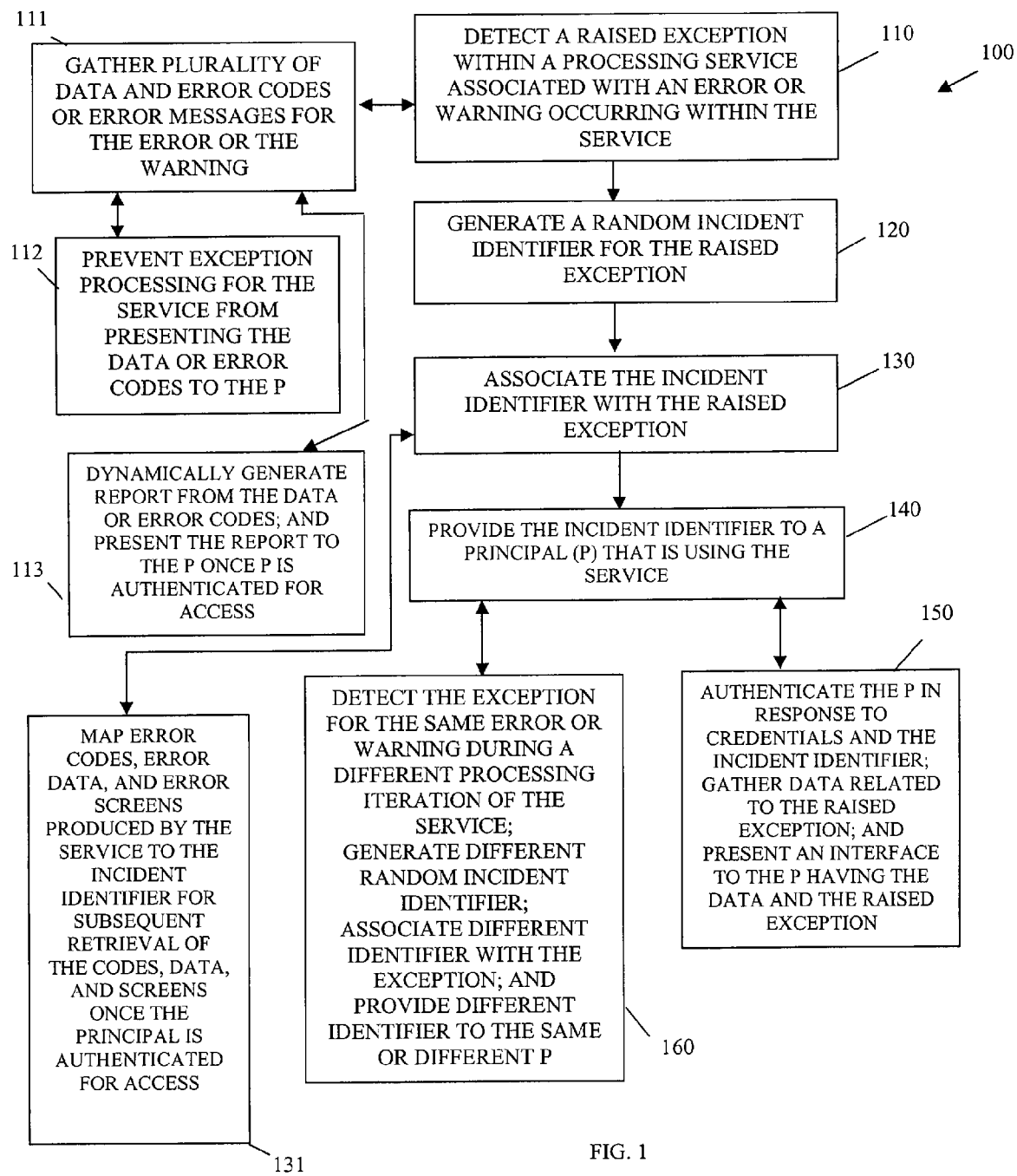
FIG. 1 is a diagram of a method for securely providing error data associated with a processing service, according to an example embodiment.

The term "resource" as used herein refers to an electronic entity, an application or set of applications, a data store, a user, a proxy, a directory, a service, or physical devices such as computers or peripherals etc. Resources may represent physical or logical entities.

In an embodiment, a "principal" is a specific type of resource, such as a user or an automated service that assumes its own unique identity within a given processing context or environment. That identity can be authenticated via credentials so that a given resource can be assured that a particular principal is who it purports to be and so that the principal and actions of the principal can be authorized and trusted.

An identity refers to an electronic identifier, attribute, or representation for a resource (e.g., physical and logical). An identity may be assigned to a resource after authentication. An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

The terms "remote" and "local" are used throughout this disclosure. These terms are relative terms that define a particular resource as being local or remote to another resource. Something is considered remote if that something exists over a wide area network (WAN) in a different environment entirely from that of something else to which it is being compared.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for securely providing error data associated with a processing service, according to an example embodiment. The method 100 (hereinafter "secure problem resolution service") is implemented as instructions in a machine-accessible and readable medium. The instructions when executed by a machine perform the processing depicted in the FIG. 1. The secure problem resolution service is also operational over and performs within a network. The network may be wired, wireless, or a combination of wired and wireless.

Initially, a principal (e.g., user or automated service) is dynamically processing a service (referred to herein and below as a "problem service") for purposes of performing some transaction and/or acquiring some content. In an embodiment, this interaction occurs via a browser over the World-Wide Web (WWW) and the Internet. The problem service may be remote to the principal's browser or processing environment or may be a locally installed service, such as but not limited to a JAVA applet, etc. The problem service may also include a plurality of other sub services or components that it interacts with, some of which may be local to the principal's environment and some of which may be remote occurring over the Internet at a remote geographic location from the principal. Thus, the problem service and its interaction with the principal and other sub services may be viewed as a complex data response network. By the time the secure problem resolution service is processing or invoked for processing the problem service of the principal has encountered or raised a problem.

Accordingly, at 110, the secure problem resolution service detects a raised exception within the processing of the problem service. This exception is associated with an error or warning that the problem service dynamically raised during its processing. The secure problem resolution service traps this raised exception and blocks any presence of it from being presented to the principal.

In an embodiment, at 111, once the secure problem resolution service detects the raised exception it gathers a plurality of data and error codes or error messages for the error or warning raised by the problem service. In an embodiment, this may entail directing the problem service via an Application Programming Interface (API) to dump its state and processing context to a log. Alternatively, this may entail acquiring data files produced by the problem service. The specifics as to how and what codes and messages that the secure problem resolution service gathers can be defined by policy or profile information associated with the problem service that defines for the secure problem resolution service what types of information to gather, how to gather it, and from where it is to be gathered.

According to an embodiment, at 112, the secure problem resolution service also prevents the exception processing that may be triggered by the problem service in response to the error or warning from presenting the data or error codes to the P. In other words, the secure problem resolution service acts as an intermediary that prevents a typical programs error processing from being exposed to the P the way that it normally would be if the secure problem resolution service were not present. This ensures that the principal does not see error codes and messages from the problem service that may expose security holes, such as configuration and environmental resource information within those error codes and messages.

In another situation, at 113, the secure problem resolution service may subsequently dynamically generate a report from the data and error codes that the problem service produced in response to the error or warning. As will be seen below, this report may subsequently be made available to the principal once the principal is properly authenticated for access.

At 120, the secure problem resolution service generates a random incident identifier in response to the raised exception that was detected at 110. The random identifier is what is initially communicated and made available to the principal in the place of the error or warning that the problem service natively produced in response to the raised exception. The incident identifier is a random number or label that may or may not be recycled by the secure problem resolution service during different iterations of the problem service. The life span and whether or not the incident identifier is capable of being recycled may be driven by policy that the secure problem resolution service evaluates and conforms to. The incident identifier is unique for a given raised exception within a given context of the execution of a problem service. A same problem for a different iteration of the same problem service generates a different incident identifier. In this way, the incident identifier is random and cannot be reverse engineered to glean some relationship or correlation between the incident identifier and the raised exception (error or warning) produced by the problem service.

At 130, the secure problem resolution service associates the randomly generated incident identifier with the raised exception (error or warning). In one case, at 131, this may be done via a mapping of the incident identifier to error codes, error data, and error message screens generated by the problem service for the error or warning. All of this information is masked from the principal and the mapping between the randomly generated incident identifier and the codes, data, and screens are securely maintained by the secure problem resolution service and not released until the principal or another authorized resource, such as an administrator or help desk engineer authenticates to the secure problem resolution service and supplies the incident identifier.

At 140, the secure problem resolution service provides the incident identifier to the principal that is using the service. Alternatively, the incident identifier may be sent to another resource, such as an administrator or an automated administrative service that can dynamically and automatically process the incident identifier.

The original and native error information (codes, warnings, screens, messages, etc.) are masked and hidden from the principal that operates the problem service. In place of this information, the principal or related resource is supplied the randomly generated incident identifier. To acquire the error information the principal or related resource (administrator, etc.) has to subsequently authenticate back to the secure problem resolution service and supply the incident identifier so that the secure problem resolution service can map it to the error information and securely provide it to the principal or related resource.

In an embodiment, at 150, the principal subsequently authenticates back to the secure problem resolution service in a secure communication session, such as over Secure Sockets Layer (SSL), HTTP using SSL (referred to as HTTPS), a Virtual Private Network (VPN) connection, within a firewalled environment, etc. The principal supplies credentials to authenticate to the secure communication session. Once authenticated the principal also supplies the incident identifier. The incident identifier permits the secure problem resolution service to gather data related to the raised exception that was detected at 110. Next, the secure problem resolution service presents an interface to the principal having the gathered error data (error codes, error messages, error screens, etc.) and the raised exception. All of this is presented and exposed to the principal after the principal has authenticated in a secure communication session and presented the incident identifier. This ensures that the problem service's error messages and codes do not inadvertently expose configuration and resource information to an intruder that may be lurking on the network. The problem services error and warning information is only exposed in a controlled and secure environment and only to an authenticated principal.

It is noted that the principal that authenticates to the secure problem resolution service for access to the error information may not be the same principal (original principal) that initially processed the problem service and produced the raised exception. That is, an administrator or even an automated response service may receive the incident identifier either automatically from the secure problem resolution service or manually via an email, website form, or other communication (such as phone) from the original principal. In response to this the administrator can securely authenticate back to the secure problem resolution service and supply the incident identifier to receive the error information and to continue to debug or evaluate the problem.

In another embodiment, at 160 (and as was briefly discussed above), the secure problem resolution service may subsequently detect another exception for the same error or warning during a different processing iteration or different session with the problem service. In response to this, an entirely new and different random incident identifier is generated by the secure problem resolution service. This new and different random incident identifier is associated with the exception and provided to the same principal or even a different principal. Thus, the incident identifier in no way conveys any information about the actual problem encountered by the problem service. The incident identifier is entirely random and conveys no useful information that can permit it to be correlated to any particular service or any particular problem. It is the combination of the incident identifier and an authenticated principal in a secure communication session that produces the relevant error information for a given problem associated with the problem service. This ensures secure problem resolution for complex data response networks.

Figure 2:
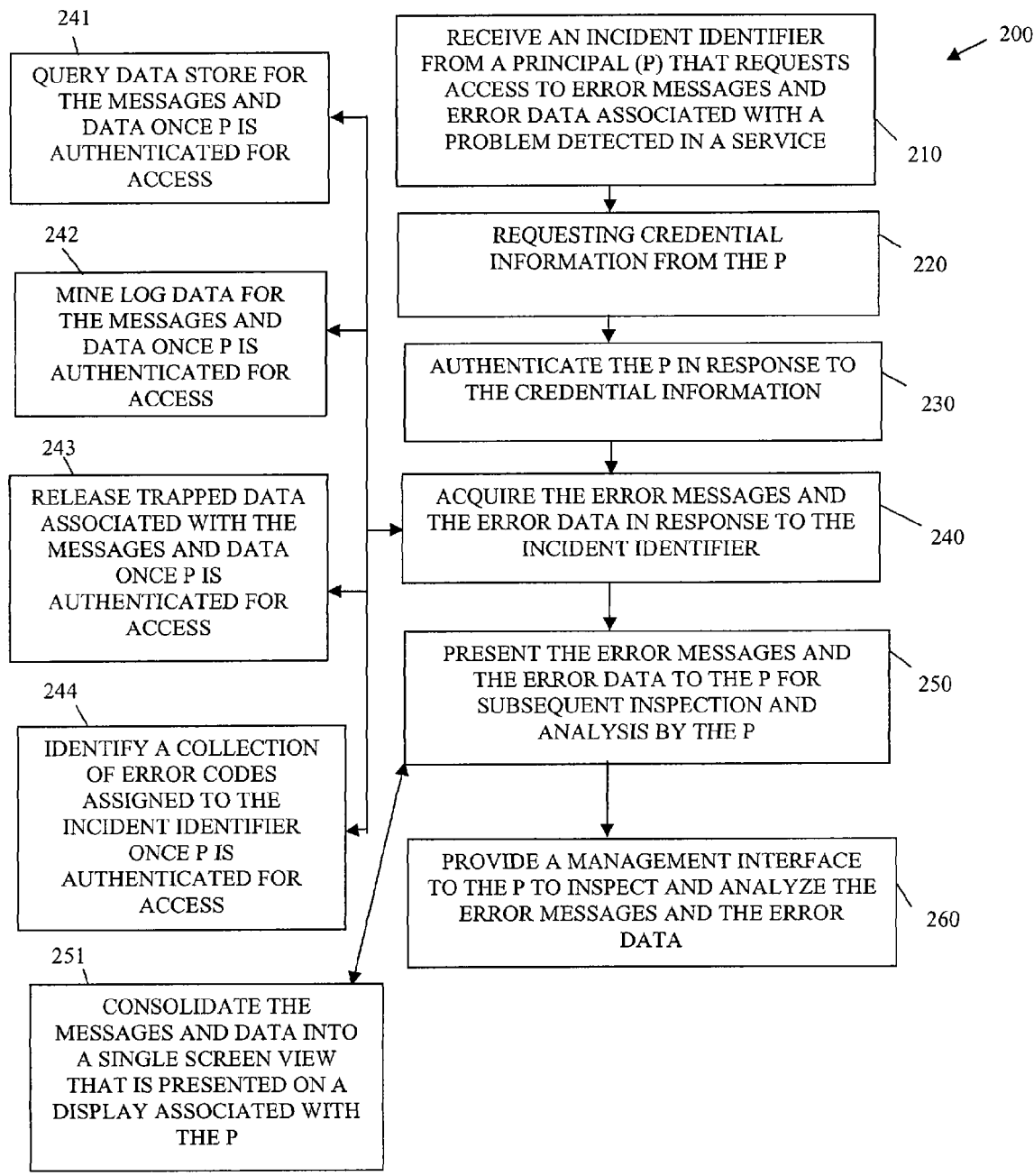
FIG. 2 is a diagram of another method for securely providing error data associated with a processing service, according to an example embodiment.

FIG. 2 is a diagram of another method 200 for securely providing error data associated with a processing service, according to an example embodiment. The method 200 (hereinafter "secure error resolution service") is implemented as instructions in a machine-accessible and readable medium. The instructions when executed by a machine perform the functions depicted in the FIG. 2. The processing is also operational over and performs within a network. The network may be wired, wireless, or a combination of wired and wireless. The secure error resolution service presents an alternative and in some ways enhanced perspective of the problem resolution service represented by the method 100 of the FIG. 1.

The method 100 for the most part described processing associated with initially generating an incident identifier and associating it with error information for a problem service that a principal is interacting with. The secure error resolution service of the method 200 describes actions when the incident identifier is subsequently produced during a secure communication session and in combination with an authenticated principal.

At 210, the secure error resolution service receives an incident identifier from a principal that is requesting access to error messages and error data associated with a problem detected in a problem service. The principal may or may not be the same principal that actually processed the problem service. So, the principal may be an end user or may be an administrator. In some cases, the principal may even be an automated error processing service or system.

At 220, the secure error resolution service request credential information from the principal. At 230, the principal is authenticated for a secure and trusted communication session with the secure error resolution service. Any authentication technique may be used to authenticate the principal. In some cases, the secure error resolution service may use a third-party, such as an identity service to authenticate the principal. Example identity services were described and incorporated by reference herein and above.

At 240, the secure error resolution service acquires error messages and error data in response to the incident identifier and when the principal is successfully authenticated for access to a secure communication session with the secure error resolution service.

A variety of techniques may be used to gather or acquire the error message and error data produced by a problem service and masked from a principal. Each technique relies on the incident identifier being mapped to the error messages, error codes, and/or error data. The mapping is privately maintained by the secure error resolution service and is not known or discoverable outside the context and environment of the secure error resolution service. Thus, to acquire the error information, a principal has to successfully authenticate to the secure error resolution service and has to supply the incident identifier.

As an example, at 241, the secure error resolution service may acquire the error messages and data by querying a data store for the messages and data once the principal is properly authenticated for a secure communication session. An internal table may be used to map the single incident identifier to a plurality of error codes, messages, and/or data, such that the secure error resolution service can query the data repositories that the problem service interacts with or produces to extract out the error information.

In another example, at 242, the secure error resolution service may acquire the error messages and data by mining log data that the problem service produces or that is produced on behalf of the problem service. This may include system logs, operating system logs, etc. An identifier for the problem service and error codes that map to the incident identifier may be used by the secure error resolution service to mine these logs and acquire the error messages and data on behalf of an authenticated principal.

In still another example, at 243, the secure error resolution service may release trapped data in its native formats, which were produced by the problem service and associated with the error messages and data, once the principal is successfully authenticated for a secure communication session with the secure error resolution service. So, the error messages and data may be held in abeyance by the secure error resolution service and presented in their native formats to the authenticated principal in a separate and secure communication session from a session that produced the error messages and data.

In one particular situation, at 244, the secure error resolution service may (once the principal is authenticated) identify a collection of error codes associated with the incident identifier. The error codes were produced by the problem service when it raised an error or warning and the mapping of these codes were maintained by the secure error resolution service to the randomly generated incident identifier. So, when an authenticated principal supplies the incident identifier, the secure error resolution service can search one or more repositories for the error codes.

At 250, the secure error resolution service presents the error messages and the error data to the principal for subsequent inspection and analysis by the principal. In an embodiment, at 251, the secure error resolution service consolidates the error messages and error data into a single screen view that is presented on a display associated with the principal. For example, all the gathered error information may be rendered to a web page within a browser in a desired format using extensible style sheets language (XSL). All the error messages and data may be viewed from the single screen. Some portions of the error messages may include hypertext links to related information or resources, such that the principal may dynamically interact with the data via the screen presentation.

According to an embodiment, at 260, the secure error resolution service may provide a management interface to the principal for purposes of inspecting and analyzing the error messages and error data. For example, the error data and messages may be dynamically presented within a WWW browser using a management service that links and integrates the error messages and data with other useful information about the messages and data.

Figure 3:
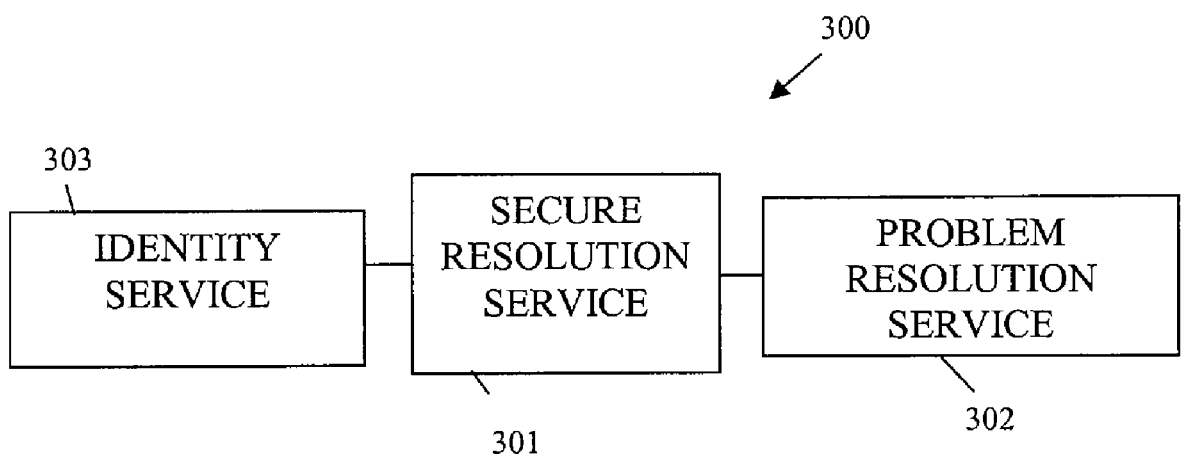
FIG. 3 is a diagram of a secure problem resolution system, according to an example embodiment.

FIG. 3 is a diagram of a secure problem resolution system 300, according to an example embodiment. The secure problem resolution system 300 is implemented as instructions in machine-accessible and readable media and is to process on one or more machines over a network. Thus, the secure problem resolution system 300 is operational over and performs within a network. The network may be wired, wireless, or a combination of wired and wireless. The secure problem resolution system 300 implements among other things the methods 100 and 200 of the FIGS. 1 and 2, respectively.

The secure problem resolution system 300 includes a secure resolution service 301 and problem resolution service 302. In some embodiments, the secure problem resolution system 300 may also include an identity service 303. Each of these and their interactions with one another over a wide area network (WAN) connection is now discussed in turn.

The secure resolution service 301 is implemented in a machine-accessible medium and is to process on a machine over a network connection. The secure resolution service 301 is processed to trap or detect error data associated with a problem service of a principal. Example processing associated with this was presented in detail above with respect to the method 100 of the FIG. 1.

The secure resolution service 301 is also processed to assign a randomly generated incident identifier to the error data. The association and mapping between the error data of the problem service and the random incident identifier is known to just the secure resolution service 301 and is disclosed under secure conditions and circumstances to ensure security for the error data.

The secure resolution service 301 is also processed to supply the incident identifier to the principal or to other principals (such as administrators, automated response services, etc.) in place of the actual error data that maps to the incident identifier. Furthermore, the secure resolution service 301 may be subsequently processed to ensure that a requesting principal is authenticated for a secure communication session via principal-supplied credentials. In response to a properly authenticated principal, who also supplies the incident identifier, the secure resolution service 301 reacquires the error data and supplies it to the problem resolution service 302.

In an embodiment, the secure resolution service 301 generates a new and unique incident identifier for each occurrence of a same version of the problem raised by the problem service. In other words, an exact same problem for the same problem service and even the same principal may produce and entirely different and unique incident identifier. In this way, the incident identifier is not correlated in any meaningful way to the problem or error data and the association or mapping to the problem and error data is privately and securely held by the secure resolution service 301.

According to an embodiment, the secure resolution service 301 maps the incident identifier to a plurality of error codes associate with the error data and is to retrieve the error data in response to the error codes once the principal is successfully authenticated for access in a secure communication session with the secure resolution service 301.

In another embodiment, the secure resolution service 301 is used to mine log data associated with the problem service or used to capture processing associated with the problem service. The log data is mined for error codes to locate and retrieve the error data on demand and when the principal is authenticated for a secure communication session with the secure resolution service 301 and also supplies the incident identifier. Again, the secure resolution service 301 maintains the mapping between the incident identifier and the error codes in private and a secure fashion.

The problem resolution service 302 is implemented in a machine-accessible and readable medium and is to process on a machine over the network. The problem resolution service 302 receives the error data from the secure resolution service 301 after the secure resolution service 301 has successfully authenticated the principal and the principal has supplied the incident identifier, such that the secure resolution service 301 can acquire the mapping from the incident identifier to the error data.

The problem resolution service 302 is processed to present the error data to the authenticated principal. The error data is presented within an interface that the principal may interact with for purposes of inspecting and resolving the problem identified in the problem service. In an embodiment, the problem resolution service 302 is to present the error data as a consolidated view within a single screen of a display associated with a display device of the principal. This may be done in a variety of manners, such as via an integrated website having web pages that permit hypertext linking to other pages, etc. In other cases, the problem resolution service 302 may simply provide a data dump of the error data to the principal or provide a link to files or repositories that include the error data.

In an embodiment, the secure problem resolution system 300 also includes an identity service 303. The identity service 303 is implemented in a machine-accessible and readable medium and is to process on a machine of the network. The machine may be the same or different from the machine that processes the secure resolution service 301 and the problem resolution service 302. Example identity services 303 were described and incorporated by reference herein and above.

The identity service 303 permits the principal to be redirected, such as via browser interactions, from the secure resolution service 301 to the identity service 303 for purposes of authenticating the principal for access to the error data. So, the identity service 303 may act as a third-party authentication service that is trusted by and in secure communications with the secure resolution service 301. In some cases, the secure resolution service 301 may even use the identity service 303 to store and manage the mapping between the incident identifier for a problem and the error data produced by the problem service.

Figure 4:
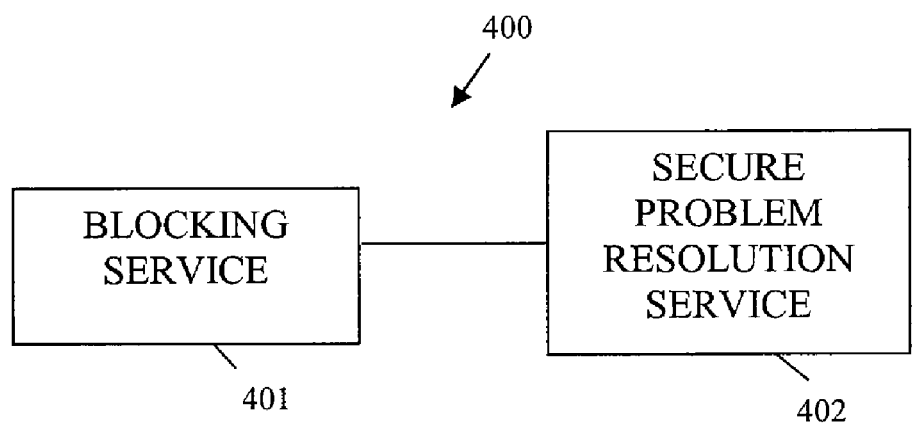
FIG. 4 is a diagram of another secure problem resolution system, according to an example embodiment.

FIG. 4 is a diagram of another secure problem resolution system 400, according to an example embodiment. The secure problem resolution system 400 is implemented within a machine-accessible and readable medium and may be processed on one or more machines. The secure problem resolution system 400 when executed by a machine performs, among other things, at least some of the processing depicted in FIGS. 1-3 secure problem resolution system 400 is also operational over a network and the network may be wired, wireless, or a combination of wired and wireless. The secure problem resolution system 400 presents an alternative arrangement and perspective to the secure problem resolution system 300 presented with respect to the FIG. 3.

The secure problem resolution system 400 includes a blocking service 401 and a secure problem resolution service 402. Each of these and their interactions with one another over a network will now be discussed in turn.

The blocking service 401 is implemented in a machine-accessible and readable medium and is to process on a network machine. The blocking service 401 is processed to trap and detect error messages natively raised by a processing problem service. Moreover, the blocking service 401 prevents the error messages from being presented to the principal that operates or interacts with the problem service. The blocking service 401 may house the error messages in their native produced formats or may be configured to translate the error messages to portable and intermediate formats, such as but not limited to eXtensible markup language (XML) formats.

In an embodiment, the blocking service 401 is processed to record the error messages in a secure log that is accessible to just the secure problem resolution service 402.

The blocking service 401 interacts with the secure problem resolution service 402 and supplies the error messages when requested or obtains the error messages in response to queries and instructions received from the secure problem resolution service 402.

The secure problem resolution service 402 is implemented in a machine-accessible and readable medium and is to process on a network machine. The secure problem resolution service 402 is processed to interact with the blocking service 401 to detect when error messages are raised. The error messages as a whole or each of the error messages are associated with randomly generated incident identifiers produced by the secure problem resolution service 402. The mapping between the collection of error messages as a whole or to each error message and the incident identifier(s) is securely maintained by the secure problem resolution service 402 in private.

The secure problem resolution service 402 also is processed to produce the randomly generated incident identifiers to the principal for subsequent use by the principal or other principals that authenticate to the secure problem resolution service 402 for a secure communication session. The secure communication session is different from and separate from a session that produced the error messaged that the blocking service 401 blocked from the principal's access and view.

When a subsequent successfully authenticating principal establishes a secure communication session with the secure problem resolution service 402 and supplies a valid incident identifier, the secure problem resolution service 402 request the error messages from the blocking service 401 and supplies them to the authenticated principal during the secure communication session.

In some cases, the blocking service 401 may have supplied a secure log or pointer to a secure log. In such a situation, the secure problem resolution service 402 may mine the secure log for the error messages related to the incident identifier supplied by the authenticated principal. The secure problem resolution service 402 may also consolidate all the error messages into a consolidated and perhaps integrated (via hypertext linking) view, which is presented to the authenticated principal during the secure communication session.

The secure problem resolution service 402 may enlist other services, such as reporting services, etc. to assemble the error data into meaningful and principal-desired views or formats. These assemblies and formats may be driven by policy or profiles associated with the principal or the problem service.

One now appreciates how secure problem resolution information may be achieved for complex data response networks. This is achieved by blocking native error messages that emanate from user services, which execute, and associating a random incident identifier with the error messages. The incident identifier is privately and securely mapped to the error messages and the incident identifier is supplied to the user or to other administrators or automated response services. During a subsequent secure communication session in which the user or other resources properly authenticate and supply the incident identifier, the original error messages are reacquired and presented.

The techniques presented herein may be layered on top of existing legacy services without modifying the legacy service. Alternatively, legacy services may be enhanced with an API to communicate directly with the techniques presented herein. In this latter scenario, enhanced processing may be achieved where the legacy services are instructed to obtain and record additional problem resolution data when an initial problem is detected, such additional problem resolution data may then be packaged in configurable manners and presented to authorized resources during a secure communication session in which the authorized resources are authenticated and have supplied a proper incident identifier that maps to the problem detected.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
   detecting a raised exception within a processing service associated with an error or warning within the service;
   generating a random incident identifier for the raised exception;
   associating the incident identifier with the raised exception;
   providing the incident identifier to a principal that is using the service;
   authenticating the principal in response to principal credentials and the incident identifier;
   gathering data related to the raised exception; and
   presenting an interface to the principal having the data and the raised exception for the principal to interact with and inspect for further problem resolution.

2. The method of claim 1 further comprising:
   detecting the raised exception for the same error or warning during a different processing iteration of the service;
   generating a different random incident identifier for the raised exception;
   associating the different incident identifier with the raised exception; and
   providing the different incident identifier to the same principal or a different principal that is using the service.

3. The method of claim 1, wherein detecting the raised exception within the processing service further includes gathering a plurality of data and error codes or error messages associated with the error or warning and associating with the raised exception.

4. The method of claim 3, wherein detecting the raised exception within the processing service further includes preventing exception processing associated with the service from presenting the plurality of data and error codes to the principal.

5. The method of claim 3 further comprising:
   dynamically generating a report from the plurality of data and error codes; and
   presenting the report to the principal when the principal authenticates for access to the report via the principal credentials and by providing the incident identifier.

6. The method of claim 1, wherein associating further includes mapping error codes, error data, and error screens produced by the service to the incident identifier to retrieve the error codes, the error data, and the error screens when the principal authenticates for access and supplies the incident identifier.

7. A method comprising:
   receiving an incident identifier from a principal that requests access to error messages and error data associated with a problem detected in a service; requesting credential information from the principal;
   authenticating the principal in response to the credential information;
   acquiring the error messages and the error data;
   presenting the error messages and the error data to the principal for subsequent inspection and analysis by the principal; and
   providing a management interface to the principal to inspect and analyze the error messages and the error data.

8. The method of claim 7, wherein acquiring further includes querying a data store for the error messages and the error data once the principal is authenticated for access using the incident identifier that was previously associated with the error messages and the error data and supplied to the principal.

9. The method of claim 7, wherein acquiring further includes mining log data for the error messages and the error data once the principal is authenticated for access using the incident identifier that was previously associated with the error messages and the error data and supplied to the principal.

10. The method of claim 7, wherein acquiring further includes releasing trapped data associated with the error messages and the error data once the principal is authenticated for access using the incident identifier that was previously associated with the error messages and the error data and supplied to the principal.

11. The method of claim 7, wherein acquiring further includes identifying a collection of error codes assigned to the incident identifier once the principal is authenticated and obtaining the error messages and error data by querying one or more of the following: devices, services, and data repositories with the error codes to obtain the error messages and error data.

12. The method of claim 7, wherein presenting further includes consolidating the error messages and the error data into a single screen view that is presented on a display associated with the principal.

13. A system, comprising:
   a secure resolution service implemented in a machine-accessible and readable medium and to process on a machine; and
   a problem resolution service implemented in a machine-accessible and readable medium and to process on the machine, wherein the secure resolution service is to trap error data associated with a problem service of a principal and assign a random incident identifier to the error data, and wherein the secure resolution service is to supply the incident identifier to the principal and is to further authenticate the principal for access via credentials and the incident identifier, and wherein the secure resolution service is to acquire the error data in response to the incident identifier and supply the error data to the problem resolution service, and the problem resolution service is to present the error data to the principal that is authenticated within an interface that the principal interacts with to resolve a problem with the problem service.

14. The system of claim 13 further comprising, an identity service that interacts with the secure resolution service and assists in authenticating the principal via the credentials.

15. The system of claim 13, wherein the secure resolution service is to generate a new and unique incident identifier for each occurrence of a same version of the problem.

16. The system of claim 15, wherein problem resolution service is to present the error data as a consolidated view within a single screen of a display associated with a display device of the principal.

17. The system of claim 13, wherein the secure resolution service is to map the incident identifier to a plurality of error codes associated with the error data and is to retrieve the error data in response to the error codes once the principal is authenticated for access.

18. The system of claim 17, wherein the secure resolution service is to mine log data associated with the problem service using the error codes to locate and retrieve the error data.

19. A system comprising:

a blocking service implemented in a machine-accessible and readable medium to process on a machine; and a secure problem resolution service implemented in a machine-accessible and readable medium to process on the machine, wherein the blocking service is to detect and to trap error messages raised within a processing problem service and prevent the error messages from being presented to a principal, and wherein the secure problem resolution service is to interact with the blocking service to assign and generate a random incident identifier to be mapped to the error messages and is to present the incident identifier to the principal for subsequent use by the principal;

the secure problem resolution service is to retrieve the error messages for the principal when the principal successfully authenticates for access and supplies the incident identifier.

20. The system of claim 19, wherein the blocking service is to record the error messages in a secure log accessible to just the secure problem resolution service.

21. The system of claim 20, wherein the secure problem resolution service is to mine the secure log for the error messages when the principal successfully authenticates for access and when the principal supplies the incident identifier and the secure problem resolution service is to present the error messages in a consolidated view to the principal.

* * * * *